United States Patent [19]

Baumgart

[11] 4,214,910

[45] Jul. 29, 1980

[54] PROCESS FOR THE PRODUCTION OF PRODUCTS FROM NATURALLY-OCCURRING MAGNESIUM ORTHOSILICATE-RICH ROCKS

[75] Inventor: Wolfgang Baumgart, Heidelberg, Fed. Rep. of Germany

[73] Assignee: Dynamidon-Koppers Industriekeramik GmbH, Düsseldorf-Heerdt, Fed. Rep. of Germany

[21] Appl. No.: 961,312

[22] Filed: Nov. 16, 1978

[30] Foreign Application Priority Data

Aug. 17, 1978 [DE] Fed. Rep. of Germany ....... 2836050

[51] Int. Cl.$^2$ ............................................. C04B 35/04
[52] U.S. Cl. ........................................ 106/58; 106/59
[58] Field of Search ..................................... 106/58, 59

[56] References Cited

U.S. PATENT DOCUMENTS

| | | | |
|---|---|---|---|
| 1,926,094 | 9/1933 | Goldschmidt et al. | 106/58 |
| 2,077,795 | 4/1937 | Harvey et al. | 106/58 |

*Primary Examiner*—James Poer
*Attorney, Agent, or Firm*—Sprung, Felfe, Horn, Lynch & Kramer

[57] ABSTRACT

The invention is an improvement in conventional processes for the production of fire-resistant products from naturally-occurring magnesium orthosilicate-rich rock with fine-grained addition of a magnesium oxide-containing substance, and optionally of a chromium oxide-containing substance, wherein the resulting granular mixture is introduced into a formed body and then calcined at sintering temperatures to provide the product, the improvement comprising adding the magnesium orthosilicate-rich starting material in an amount such that the product obtained has a mole ratio of magnesium oxide to silicon dioxide of 1.64:1 to 1.85:1, and sintering the product sufficiently to achieve a gross density of more than 2.80 g./cc.

15 Claims, No Drawings

PROCESS FOR THE PRODUCTION OF PRODUCTS FROM NATURALLY-OCCURRING MAGNESIUM ORTHOSILICATE-RICH ROCKS

The present invention is concerned with a process for the production of products from naturally-occurring magnesium orthosilicate-rich rocks.

It is known to produce products from magnesium orthosilicate-rich raw materials, for example, olivine, dunite, peridotite, from serpentine and compounds resulting therefrom by the addition of magnesium oxide-containing substances and calcining at high temperatures. Such forsterite products are employed as very fire-resistant stones and masses and are so constituted that the minerals resulting from the calcination of magnesium orthosilicate-rich rocks and by the take up of magnesium oxide achieve a high fire resistance. In order to ensure this property, the amount of added magnesium oxide-containing substances is such that the forsterite content in the product is as high as possible and thus the mole ratio of magnesium oxide to silicon dioxide is very close to but generally above 2:1 so that the products contain free magnesia.

As is known, the amount of added magnesium oxide-containing substance depends upon the necessary properties of the forsterite products but is high enough to avoid deleterious side effects, for example melt formations and shrinkage upon firing. It is well known that products which consist mainly of magnesium orthosilicate-containing material, such as olivine rock, serpentine or serpentine-rich rocks, can contain various amounts of added materials, for example, magnesia, chromium-containing substances and, in some cases, boric acid-, silicic acid- or lime-containing binding agents. These products and the processes for the production thereof are characterized by particular amounts of the material to be worked up and by particular forms of use, for example by an advantageous granulation, which then plays a part with regard to binding or sintering in the calcination process.

All the above-mentioned processes display a not inconsiderable disadvantage, namely, a relatively low gross density of the sintered products even in the case of a high content of magnesium orthosilicate-containing raw materials. Not only the thermal decomposition of the magnesium hydrosilicates but also mineral changes as a result of magnesium oxide take up bring about the development of additional pore spaces and also an increase in volume. In order to increase the density of forsterite rocks, the calcination temperature was, therefore, increased to such an extent that a shrinkage upon firing takes place. This process requires the use of fuel and partially negates the addition of magnesium oxide-containing materials, which is necessary for the conversion of the less temperature-stable accompanying minerals.

Thus, it is an object of the present invention to provide a process for the production of products from naturally-occurring magnesium orthosilicate-rich rocks which avoids the above-mentioned disadvantages and provides a product which, by a limited, small addition of magnesium oxide-containing material to magnesium orthosilicate-rich rock, for example olivine or dunite, has a crude density of more than 2.80 g./cc. in the case of a mole ratio of magnesium oxide to silicon dioxide of less than 1.85:1 but of not less than 1.64:1.

Thus, according to the present invention, there is provided a process for the production of products from naturally-occurring magnesium orthosilicate-rich rocks with fine-grained addition of a magnesium oxide-containing substance and optionally of a chromium-oxide containing substance, which are introduced into the formed body as a granular or powdery mixture and then calcined at a temperature at which sintering of the material takes place, wherein the magnesium oxide-containing substance is added to the magnesium orthosilicate-rich starting material in an amount such that the product obtained has a mole ratio of magnesium oxide to silicon dioxide of less than 1.85:1 but not less than 1.64:1, the products being so highly sintered that a gross density of more than 2.80 g./cc. is achieved.

The present invention also provides a product comprising naturally-occurring magnesium orthosilicate-rich rock with fine grained additions of a magnesium oxide-containing substance and optionally of a chromium oxide-containing substance, the product, due to the addition of the magnesium oxide-containing substance to the magnesium orthosilicate-rich starting material, having a mole ratio of magnesium oxide to silicon dioxide of 1.85:1 to 1.64:1 and having a crude density of more than 2.80 g./cc.

According to German Patent Specification No. 746,717, the addition of magnesite and the like for the production of powdery mixtures of preferably non-dehydrated serpentine and magnesium-rich materials is such that the final product contains an excess of magnesium oxide or the product contains somewhat less magnesium oxide than that corresponding to the composition of the magnesium orthosilicate, for example 1.85 atoms of magnesium per 1 atom of silicon. Since, however, this atomic ratio is not analogous to the corresponding mole ratio of the oxides and the starting materials, i.e. serpentine or serpentine-rich minerals, have a forsterite content lower than 60% by weight and a calcination loss of more than 5% and no statements are made regarding the gross density of the products, the teachings of ths German patent specification cannot be utilized for producing the products according to the present invention.

Additions of crystallisation-promoting material to comminuted olivine rock of various grain size contribute, according to German Patent Specification No. 623,644, due to crystallization upon heating to 500° to 1500° C., to the solidification of the products, thus, for example, also a mixed addition of equal parts of magnesite and clay to comminuted olivine rock. Formed bodies of high strength are obtained by calcination at 1300° C. In this connection, no statements are made regarding the mole ratio of magnesium oxide to silicon dioxide or regarding the gross density of the products or regarding the composition of the magnesite-clay melt phase.

In the case of the presence of comparatively large amounts of granulated olivine material, according to German Patent Specification No. 607,591, it is not necessary to add the amount of magnesium oxide which is necessary for the conversion of the total amount of magnesium silicate present into magnesium orthosilicate since the granular olivine rock, prior to making the mixture, is subjected to dehydration, for example by calcination. The process has the object of producing volume-stable products but without any statements being made concerning the mole ratio of magnesium oxide to silicon dioxide or concerning the gross density of the products.

That in the case of the interaction of magnesium oxide-containing substances with magnesium orthosilicate-rich rocks, the magnesium oxide does not act as a binding agent but rather as a substance for increasing the fire resistance, is described in German Patent Specification No. 605,371. Additions of about 5% by weight magnesium oxide have proved to be advantageous. The presence of binding clay in the batch necessitates a reduction of the calcination temperature since otherwise softening occurs. Reduction of the magnesium oxide addition to 0.1 to 3% by weight, in order to achieve a product with a gross density of more than 2.80 g./cc., is not to be deduced from the process.

According to French Patent Specification No. 790,877, olivine-containing raw materials are employed which gives products containing 1.6 to 1.9 atoms of magnesium per atom of silicon. However, the products according to the present invention are characterized by a mole ratio of magnesium oxide to silicon dioxide of less than 1.85:1 but of not less than 1.64:1. Both statements are based on different reference bases.

According to French Patent Specification No. 914,717, magnesium ooxide is added to olivine-containing rock in an amount such that the calcined products have a crude density of 2.72–2.80 g./cc. but the amount of magnesium oxide added is such that a magnesium oxide: silicon dioxide mole ratio of 3.2 to 4.05:1 is present. The addition of chrome ore in an amount of from 20 to 25% by weight explains the increase of the gross density. These process steps do not express the findings upon which the present invention is based.

After an extremely careful study of the changes of the properties of the minerals concerned in the case of heating magnesium silicates, it was appreciated that a dunite rock which mainly contained forsterite, enstatite and only small amounts of hydrosilicates, can be calcined to give a dense body when the magnesium oxide content of the magnesium orthosilicate-rich starting rock is increased by 0.1 to 3% by weight magnesium oxide and preferably by 0.5 to 2.8% by weight magnesium oxide. During the sintering, a body is then formed which, as a result of only a low shrinkage due to firing, displays a density and strength which makes it useful as a work material for numerous fields of use.

Furthermore, we have found that a gross density of more than 2.80 g./cc. in the calcined product in the case of a magnesium oxide:silicon dioxide ratio of less than 1.85:1 but of not less than 1.64:1 can only be achieved with the use of magnesium orthosilicate-rich rock according to the process of the present invention when the magnesium orthosilicate-rich rock has a forsterite content of at least 60% by weight and a calcination loss of less than 5%. If the naturally-occurring magnesium orthosilicate-rich rock does not correspond to these conditions, the amount of the magnesium oxide-containing addition used according to the present invention does not keep the shrinkage by firing in a controllable range, whch is a prerequisite for a satisfactory production of accurately sized products. A mechanical or thermal removal of hydrosilicates from the starting materials, preceding the mixing of the components, can be provided for the reduction of the calcination loss.

Without the addition of magnesium oxide or of magnesium oxide-containing substances, the decomposition of, for example, olivine rock already commences above 800° C. with the oxidation of the lattice FeO to $Fe_2O_3$, which starts to change the $Fe_3O_4$ above 1100° C. The silicic acid liberated by the decomposition of the iron silicate in the olivine reacts with the forsterite with the formation of enstatite so that, upon further heating of the olivine rock, the mixture of forsterite, enstatite and iron oxides gives rise to deformations due to gradual softening. These processes are, by means of the measures according to the present invention, controlled in such a manner that accurately sized products of high density can be obtained.

The previously known forsterite-containing products produced from magnesium orthosilicate-containing rocks have thus either been adjusted by high magnesium oxide additions to give a mole ratio of magnesium oxide to silicon dioxide of more than 2:1, the gross density of the products thereby being below 2.80 g./cc., or, in order to achieve a higher density of the products, hydrosilicate-containing starting materials are worked up which have a forsterite content of less then 60% by weight and have a calcination loss of more than 5%. Thus, the product according to the present invention is a constructional material made from a magnesium orthosilicate-rich material, preferably dunite, which is mixed with small amounts of one or more fire-resistant materials of another type, for example magnesium oxide, sinter magnesite, caustic calcined magnesite or compounds giving magnesium oxide upon heating, chromium compounds or materials containing such, shaped and calcined at a temperature of from 1300° to 1500° C. Such a constructional material is temperature-resistant within a wide range and, because of its excellent gross density and large heat storage capacity, is an economically favourable heat storage material. It can also be employed in the construction of industrial furnaces and as a slag-resistant material, in a shaped or unshaped state, and also as an insulation material.

In the case of the production of products from magnesium orthosilicate-rich rock, the present invention starts from a process according to which the starting mixture consists at least of 90% by weight magnesium orthosilicate-rich rock with a forsterite content of at least 60% by weight and a calcination loss of less than 5% and with a particle size of 0–5 mm., with an addition of a magnesium oxide-containing substance with a particle size of at most 0.063 mm., 70 to 90% by weight of the added amount having a particle size of less than 0.044 mm. The amount is thereby to be such that it can provide the magnesium orthosilicate-rich rock with a magnesium oxide content increased by 0.1 to 3% by weight and preferably by 0.5 to 2.8% by weight. Chromium oxide-containing substances can possibly also be added to the mixture, the particle size of the chromium trioxide-containing additive being 0 to 0.5 mm. and preferably 0 to 0.1 mm. The amount is to be such that the chromium trioxide content in the product from the magnesium orthosilicate-rich rock can increase to a maximum of 4% by weight. Such a mixture is moistened in known manner with water or water-soluble binding agents, for example silicates, phosphates, sulphonates or the like, pressed into stones and these then calcined to give solid bodies.

According to the process of the present invention, for the achievement of a gross density in the calcined product of more than 2.80 g./cc., the body is calcined at a temperature of from 1300° to 1500° C.

The following Examples are given for the purpose of illustrating the present invention, all percentages, unless otherwise stated, being percentages by weight.

In the Examples and in the comparative experiments, raw materials of the following compositions were used as starting materials:

(a) Magnesium silicate rocks

|  | A | B | C | D | E | F |
|---|---|---|---|---|---|---|
| calcination loss | 0.6 | 0.7 | 2.4 | 1.2 | 0.5 | 1.2% |
| $SiO_2$ | 41.1 | 43.7 | 42.2 | 42.0 | 41.9 | 41.2 |
| MgO | 50.1 | 47.3 | 44.4 | 48.4 | 49.3 | 45.1 |
| $Fe_2O_3$ | 7.1 | 7.2 | 8.1 | 7.4 | 6.6 | 10.7 |
| $Al_2O_3$ | 0.7 | 0.6 | 1.4 | 0.5 | 1.2 | 0.9 |
| CaO | 0.1 | 0.1 | 1.2 | 0.2 | 0.3 | 0.2 |
| $Cr_2O_3$ | 0.3 | 0.4 | 0.3 | 0.3 | 0.2 | 0.7 |
| $MgO:SiO_2$ | 1.83 | 1.62 | 1.58 | 1.73 | 1.76 | 1.64 |

(b) Sinter magnesite

| | |
|---|---|
| $SiO_2$ | 4.2% |
| $Fe_2O_3$ | 1.4 |
| $Al_2O_3$ | 0.3 |
| CaO | 1.9 |
| MgO | 92.2 |
| $CaO:SiO_2 =$ | 0.48:1 |

(c) Chrome ore

| | |
|---|---|
| calcination loss | 1.0% |
| $SiO_2$ | 4.1 |
| $Fe_2O_3$ | 16.4 |
| $Al_2O_3$ | 24.0 |
| $Cr_2O_3$ | 35.7 |
| CaO | 0.4 |
| MgO | 18.4 |

The $Fe_2O_3$ values here given contain the total amount of iron.

EXAMPLE 1

As starting materials, there were used the magnesium silicate rocks A to F and, in each case, for comparative experiments, worked up according to the following batch to give mixtures:
97.0% rock with the particle size of 0–5 mm.
0.9% sinter magnesite, smaller than 0.063 mm.
1.0% sulphite waste liquor powder
1.1% sodium metaphosphate
water The mixture ready for pressing has a moisture content of 2.0% and had the following particle size distribution:
+2 mm. = 34%
+1 mm. = 12%
+0.5 mm. = 25%
+0.2 mm. = 8%
+0.09 mm. = 6%
+0.06 mm. = 2%
−0.06 mm. = 13%

The mass was shaped into stones on a hydraulic press with a pressing force of 880 kp/cm², subsequently dried for 24 hours at 70° C. and then heated in a tunnel furnace to 1480° C. with a residence time of 6 hours. The stones thus obtained had the following properties:

|  | A | B | C | D | E | F |
|---|---|---|---|---|---|---|
| mole ratio of $MgO:SiO_2$ | 1.86 | 1.65 | 1.61 | 1.76 | 1.80 | 1.67 |
| crude density g/cc. | 2.78 | 2.88 | — | 2.82 | 2.82 | 2.86 |
| shrinkage by firing in % | 0.4 | 1.0 | 2.3 | 0.7 | 0.7 | 0.9 |

From this summary, it can be seen that the stones produced from magnesium silicate rocks A and C do not provide the desired results, their mole ratio values lying outside of the range according to the present invention. Stones of composition C were cracked and displayed softening. The stones from starting mixtures B, D, E and F were good and corresponding to the expected characteristics.

EXAMPLE 2

When the individual mixtures are adjusted to the particular starting material, then the following values were obtained. The production was in accordance with the process of Example 1 except for the indicated deviations of the calcination temperature.

|  | A | B | C | D | E | F |
|---|---|---|---|---|---|---|
| rock wt. % | 97.3 | 94.5 | 93.1 | 92.7 | 97.0 | 94.9 |
| sinter magnesite | 0.6 | 1.4 | 2.8 | 1.2 | 0.9 | 1.0 |
| chrome ore | — | 2.0 | 2.0 | 4.0 | — | 2.0 |
| sulphite waste liquor | 1.0 | 1.0 | 1.0 | 1.0 | 1.0 | 1.0 |
| phosphate | 1.1 | 1.1 | 1.1 | 1.1 | 1.1 | 1.1 |
| calcination temperature °C. | 1490 | 1480 | 1460 | 1480 | 1480 | 1480 |
| gross density g/ccm | 2.83 | 2.84 | 2.87 | 2.83 | 2.82 | 2.84 |
| mole ratio $MgO:SiO_2$ | 1.85 | 1.67 | 1.67 | 1.77 | 1.80 | 1.68 |

As is shown by the series of experiments according to Example 2, according to the teachings of the present invention, magnesium orthosilicate-rich, naturally-occurring rocks with a forsterite content of at least 60% by weight can be worked up to give products with a gross density of more than 2.80 g./cc. Starting material C possesses, according to mineral-analytical investigation, a forsterite content of just 60% by weight. Consequently, the calcined body displays the greatest degree of shrinkage within the comparative series but, with 1.4%, still remains within the controllable range. The stones of series B display, in the case of a comparison with the stones of series C, in the case of the same value for the mole ratio of magnesium oxide to silicon dioxide, a shrinkage upon firing of only 0.8% longitudinal change.

It will be understood that the specification and examples are illustrative but not limitative of the present invention and that other embodiments within the spirit and scope of the invention will suggest themselves to those skilled in the art.

What is claimed is:

1. In a process for the production of products from naturally-occurring magnesium orthosilicate-rich rock with fine-grained addition of a magnesium oxide-containing substance and optionally of a chromium oxide-containing substance, then introduced into the formed body as a granular mixture and then calcined at sintering temperatures, the improvement comprising adding the magnesium orthosilicate-rich starting material in an amount such that the product obtained has a mole ratio of magnesium oxide to silicon dioxide of 1.64:1 to 1.85:1, and sintering the product sufficiently to achieve a gross density of more than 2.80 g./cc.

2. Process according to claim 1, wherein the naturally-occurring magnesium orthosilicate-rich rock used is olivine or dunite with a forsterite content of at least 60% and with a calcination loss of less than 5%.

3. Process according to claim 1 or 2, wherein the naturally-occurring magnesium orthosilicate-rich rock is comminuted and used with a particle size of 0 to 5 mm.

4. Process according to claim 1, wherein the magnesium oxide-containing substance used is sinter magnesite, caustic calcined magnesite or a compound which gives magnesium oxide upon heating.

5. Process according to claim 1, wherein the magnesium oxide-containing substance has a maximum particle size of 0.063 mm., 70 to 90% thereof having a particle size of less than 0.044 mm.

6. Process according to claim 1, wherein the chromium oxide-containing substance used is chrome ore or a chromium oxide-rich slag.

7. Process according to claim 1, wherein the chromium oxide-containing substance has a particle size of 0 to 0.5 mm., the amount thereof being such that the chromium trioxide content in the final product is at most 4% by weight.

8. Process according to claim 7, wherein the chromium oxide-containing substance has a particle size of 0 to 0.1 mm.

9. Process according to claim 1, wherein the amount of the magnesium oxide-containing substance added to the magnesium orthosilicate-rich rock is such that the magnesium oxide content of the product produced, in comparison with the rock, is increased by 0.1 to 3% by weight in order to obtain a calcined product with a gross density of more than 2.80 g./cc.

10. Process according to claim 9, wherein the amount of magnesium oxide-containing substance added to the magnesium orthosilicate-rich rock is such that the magnesium oxide content of the product produced, in comparision with the rock, is increased by 0.5 to 2.8% by weight.

11. Process according to claim 1, wherein the amount of the magnesium oxide addition, referred to the magnesium-oxide-containing substance, is such that the product has a magnesium oxide: silicon dioxide mole ratio of less than 1.85:1 but not less than 1.64:1, a gross density of more than 2.80 g./cc. being achieved.

12. Process according to claim 1, wherein there is achieved a mole ratio of magnesium oxide to silicon dioxide of less than 1.85:1 but of not less than 1.64:1 and a gross density of the calcined product of more than 2.80 g./cc. when the calcination temperature is from 1300° to 1500° C.

13. Product comprising naturally-occurring magnesium orthosilicate-rich rock and a magnesium oxide-containing substance prepared by the process claimed in claim 1.

14. Product comprising naturally-occurring magnesium orthosilicate-rich rock and a magnesium oxide-containing substance and a chromium oxide-containing substance, prepard by the process claimed in claim 1.

15. Product comprising naturally-occurring magnesium orthosilicate-rich rock with fine grained additions of a magnesium oxide-containing substance in a mole ratio of magnesium oxide to the silicon dioxide contained in said rock of 1.64:1 to 1.85:1 and having a crude density of at least 2.80 g./cc.

* * * * *